US011901599B1

(12) United States Patent
Jensen et al.

(10) Patent No.: US 11,901,599 B1
(45) Date of Patent: Feb. 13, 2024

(54) WAVEGUIDE ASSEMBLY COMPRISING FIRST AND SECOND WAVEGUIDE PORTIONS JOINED TOGETHER THROUGH A GAP INTERFACE AND COMMUNICATION SYSTEM FORMED THEREFROM

(71) Applicant: Space Exploration Technologies Corp., Hawthorne, CA (US)

(72) Inventors: Anders Jensen, Beaux Arts, WA (US); Samuel T. Reineman, Kirkland, WA (US); Robert D. Giglio, Seattle, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 36 days.

(21) Appl. No.: 17/826,040

(22) Filed: May 26, 2022

Related U.S. Application Data

(60) Provisional application No. 63/194,120, filed on May 27, 2021.

(51) Int. Cl.

| | |
|---|---|
| ***H01P 1/04*** | (2006.01) |
| ***H01P 3/127*** | (2006.01) |
| ***H01P 11/00*** | (2006.01) |
| ***H01P 1/165*** | (2006.01) |
| ***H01P 1/161*** | (2006.01) |
| ***H01Q 15/14*** | (2006.01) |
| ***H01Q 15/24*** | (2006.01) |

(52) U.S. Cl.

CPC .............. *H01P 1/042* (2013.01); *H01P 1/161* (2013.01); *H01P 1/165* (2013.01); *H01P 3/127* (2013.01); *H01P 11/002* (2013.01); *H01Q 15/14* (2013.01); *H01Q 15/242* (2013.01)

(58) Field of Classification Search

CPC ........................................................ H01P 1/042
USPC ........................................................... 333/254
See application file for complete search history.

(56) References Cited

U.S. PATENT DOCUMENTS

| | | | | |
|---|---|---|---|---|
| 2,476,621 A * | 7/1949 | Okress | H01P 1/042 | 285/330 |
| 7,592,887 B2 * | 9/2009 | Chao et al. | H01P 1/042 | 333/254 |
| 2002/0125971 A1 * | 9/2002 | Sciarrino | H01P 3/14 | 333/248 |
| 2008/0303613 A1 * | 12/2008 | Lau et al. | H01P 1/042 | 333/254 |

* cited by examiner

*Primary Examiner* — Benny T Lee
(74) *Attorney, Agent, or Firm* — Polsinelli PC

(57) ABSTRACT

In one embodiment, a waveguide assembly includes a first waveguide portion having a first end, a second end, and a first waveguide channel extending between the first end and the second end, and a second waveguide portion having a first end, a second end, and a second waveguide channel extending between the first end and the second end, wherein the first waveguide portion and the second waveguide portion are configured to connect such that the first waveguide channel and the second waveguide channel form a combined channel, wherein the combined channel includes a gap interface between the first waveguide channel and the second waveguide channel.

20 Claims, 9 Drawing Sheets

WAVEGUIDE ASSEMBLY COMPRISING FIRST AND SECOND WAVEGUIDE PORTIONS JOINED TOGETHER THROUGH A GAP INTERFACE AND COMMUNICATION SYSTEM FORMED THEREFROM

CROSS-REFERENCE TO RELATED APPLICATIONS

This application claims priority to U.S. Provisional Application No. 63/194,120, filed on May 27, 2021, entitled "WAVEGUIDE ASSEMBLY HAVING A BLIND MATE INTERFACE", the contents of which are incorporated herein in their entirety and for all purposes.

TECHNICAL FIELD

The present technology pertains to a waveguide interface between a first waveguide portion and a second waveguide portion and more particularly to a waveguide interface to provide a joint between the waveguides with improved electrical properties over a range of axial motion and alignment.

BACKGROUND

A waveguide is a structure used to carry radio waves. Waveguides can be used as transmission lines mostly at microwave frequencies, for such purposes as connecting microwave transmitters and receivers to antennas. Waveguides can be part of the components in satellite communication systems and microwave radio links.

The electromagnetic waves transmitted through waveguides travel down the waveguide in a zig-zag path, being repeatedly reflected between opposite walls of the waveguide. In some structures, a modem and receive/transmit components that include waveguides can be integrated into an integrated signal chain (which may be a line replaceable unit, LRU) that can be mounted to the back of a reflector, for example, for a parabolic antenna.

A feed assembly in an antenna structure including a reflector is configured on a front of the reflector to set the axial alignment with respect to the reflective surface profile of the reflector. The physical configuration of waveguides that pass electromagnetic signals between transmit/receive components and an antenna is important. For example, high frequency signals are passed through waveguides that have a small dimension (such as a millimeter in width) for extremely high frequency communications. Lower frequency electromagnetic signals are physically larger in size and require waveguides with much larger dimensions.

One challenge in the antenna and modem component framework described above is the waveguide-to-waveguide coupling between the feed assembly at the front of the reflector and the integrated signal chain configured to interface with the reflector.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure addresses the issues raised above with respect to the challenge of waveguide-to-waveguide coupling between the feed assembly at the front of the reflector and the integrated signal chain configured to interface with the reflector. The solution is a waveguide assembly having a first waveguide portion with a fixed choke configured therein and a second waveguide portion. The two portions are machined to be connected via a slip fit in which a gap is maintained at an interface between the first waveguide portion and the second waveguide portion. An interface configured to have such a gap may be referred to as a "gap interface." The combination of the gap and the choke configuration enables signals to be passed through the combined waveguide assembly with the appropriate bandwidth or range of frequencies desired. The waveguide assembly allows the first waveguide portion to be attached to radio components such as transmitters and receivers and the second waveguide portion to be attached to the reflector or other type of antenna. The waveguide assembly enables some movement between the two portions while maintaining the ability to efficiently transmit a desired bandwidth of signals across the waveguide assembly.

In one exemplary embodiment, a waveguide assembly includes a first waveguide portion having a first end, a second end, and a first waveguide channel extending between the first end and the second end, and a second waveguide portion having a first end, a second end, and a second waveguide channel extending between the first end and the second end, wherein the first waveguide portion and the second waveguide portion are configured to connect such that the first waveguide channel and the second waveguide channel form a combined channel, wherein the combined channel includes a gap interface between the first waveguide channel and the second waveguide channel.

In one example, a waveguide assembly can include a first waveguide portion having a first end, a second end, and a first waveguide channel extending between the first end and the second end, the first waveguide channel having cross-section dimensions. The first waveguide portion further can include a receiving portion configured at the second end, the receiving portion having cross-sectional dimensions that are larger than the cross-sectional dimensions of the first waveguide channel. The waveguide assembly can include a second waveguide portion having a first end, a second end, and a second waveguide channel extending between the first end and the second end. The second waveguide channel can have cross-sectional dimensions that are substantially the same as the cross-sectional dimension of the first waveguide channel and can have an extending portion at the first end that is complementary to the receiving portion at the second end of the first waveguide portion. The first waveguide portion and the second waveguide portion can be configured to connect such that the first waveguide channel and the second waveguide channel form a combined channel. The combined channel can include a gap interface between the first waveguide channel and the second waveguide channel. The gap interface can also be considered as being between the first and second waveguide portions. A gap size of the gap interface can be less than or equal to $\lambda/10$. In one aspect, the first and second waveguide portions can include a positive stop that guarantees that the gap interface or gap size is maintained such that the first and second waveguide portions will not touch.

The waveguide assembly can include a choke in surrounding relationship with the gap. The choke can include an internal groove configured to surround the interface between the first waveguide channel and the second waveguide channel. The choke can be fixed in either the first waveguide portion or the second waveguide portion. For example, the choke can be an annular groove defined in the receiving portion of the first waveguide portion. In another aspect, the choke can be configured in part from the first waveguide portion and in part from the second waveguide portion. In one aspect, the choke can be characterized as an axially symmetric choke.

The waveguide assembly can also include a seal between the receiving portion of the first waveguide portion and the extending portion of the second waveguide portion. The first and second waveguide channels can have circular cross-sectional dimensions or other shapes for the cross-sectional configuration. The receiving portion of the first waveguide portion can have circular or other shapes for cross-sectional dimensions or configurations.

A first end of the waveguide assembly can be configured to connect to a polarization component. A second end of the waveguide assembly can be configured to connect to a reflector or some antenna structure.

The waveguide assembly can have other structures that aid in fitting the portions together. The first waveguide portion further can include a first bevel portion for coarse alignment. The second waveguide further can include a second bevel portion for fine alignment. The second waveguide portion further can include an outer flange portion configured to surround the outer surface of the first waveguide portion. In one aspect, the second waveguide portion further can include an attachment flange portion for attachment of the second waveguide portion to another component.

The disclosure also includes methods of using or coupling with a waveguide assembly as disclosed herein. An example method can include attaching a first waveguide portion and a second waveguide portion. The first waveguide portion can have a first end, a second end, and a first waveguide channel extending between the first end and the second end. The first waveguide channel has cross-section dimensions. The first waveguide portion further can include a receiving portion configured at the second end in which the receiving portion has cross-sectional dimensions that are larger than the cross-sectional dimensions of the first waveguide channel.

The second waveguide portion can have a first end, a second end, and a second waveguide channel extends between the first end and the second end. The second waveguide channel has cross-sectional dimensions that are substantially the same as the cross-sectional dimension of the first waveguide channel and has an extending portion at the first end that is complementary to the receiving portion of the second end of the first waveguide portion. The first waveguide portion and the second waveguide portion are configured to connect such that the first waveguide channel and the second waveguide channel form a combined channel. The combined channel comprises a gap interface between the first waveguide channel and the second waveguide channel. A choke fixed within the first waveguide portion can be used in connection with the gap interface to enable movement between the different portions while maintaining signal transmission across a desired bandwidth.

The method can include passing a certain bandwidth of electromagnetic signals through the waveguide assembly based at least in part on the structure of the gap interface and the choke.

In another aspect, a communication system can include a polarizer, a first waveguide portion having a first end and a second end and a second waveguide portion having a first end and a second end. The first waveguide portion and the second waveguide portion can be coupled at the second end of the first waveguide portion and the first end of the second waveguide portion to define a waveguide channel having a gap interface between the first and second waveguide portions. The communication system can include a reflector, wherein the polarizer is coupled to the first end of the first waveguide portion and the reflector is attached to the second end of the second waveguide portion. A choke can be configured in the first waveguide portion or the second waveguide portion.

A gap size of the gap interface can have a size less than or equal to $\lambda/10$, wherein $\lambda$ refers to a wavelength of a signal passing through the communication system. A positive gap stop or structure can be used to ensure that the first waveguide portion and the second waveguide portion do not touch. The combination of the gap interface and the choke can enable the efficient transmission of signals for the particular bandwidth of frequencies according to the design of the waveguide assembly.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings, where like features are denoted by the same reference labels throughout the detailed description of the drawings, and in which.

DETAILED DESCRIPTION OF EXAMPLE EMBODIMENTS

Figure 1:
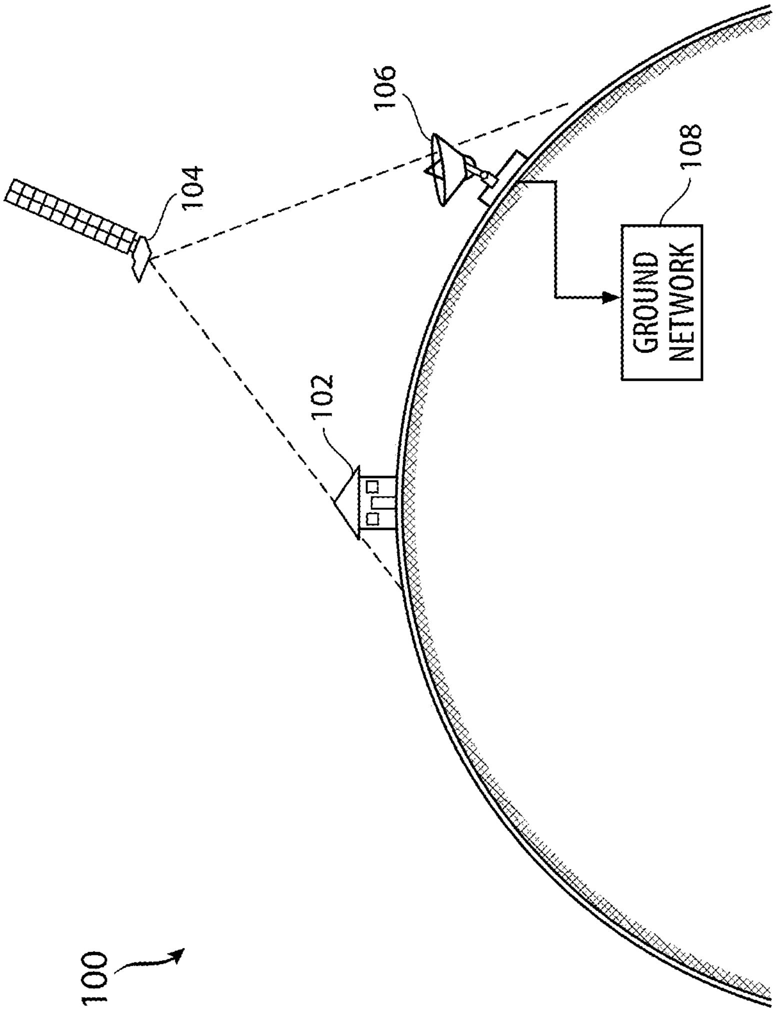
FIG. 1 illustrates a not-to-scale schematic view of a satellite communication system including a satellite, user terminal, and gateway in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Systems are currently being deployed to provide communication via constellations of satellites. FIG. 1 is a not-to-scale schematic diagram that illustrates a simple example of communication in a satellite communication system 100. An endpoint user terminal 102 is installed at a house, a business, a vehicle, or another location where it is desired to obtain communication access via a network of satellites. A communication path is established between the endpoint user terminal 102 and a first satellite 104. In the illustrated embodiment, the first satellite 104, in turn, establishes a communication path with a gateway terminal 106. In another embodiment, the first satellite 104 may establish a communication path with another satellite prior to communication with a gateway terminal 106. The gateway terminal 106 is physically connected via fiber optic, Ethernet, or another physical connection to a ground network 108. The ground network 108 may be any type of network, including the Internet or other types of networks.

Figure 2A:
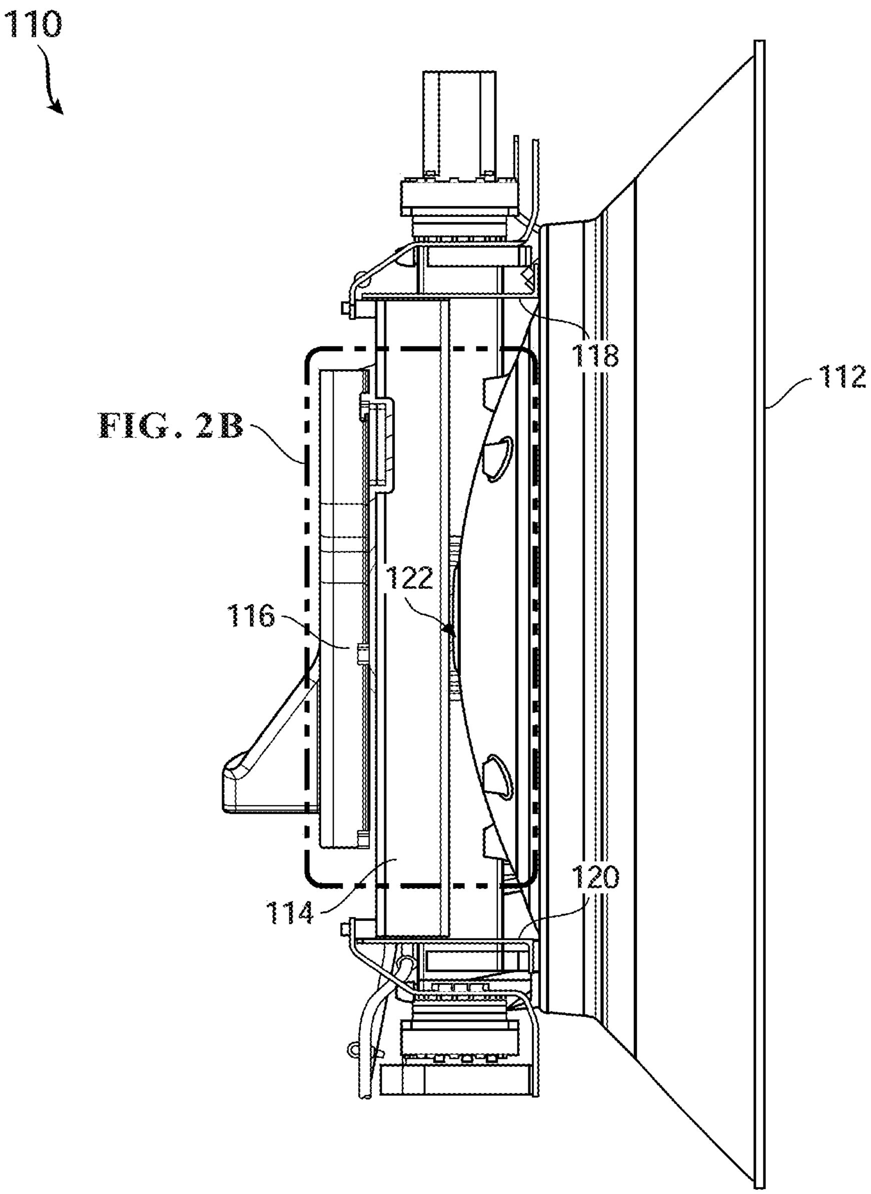
FIG. 2A illustrates an antenna assembly in an exemplary antenna communication system, such as a gateway system in accordance with embodiments of the present disclosure.
Figure 2B:
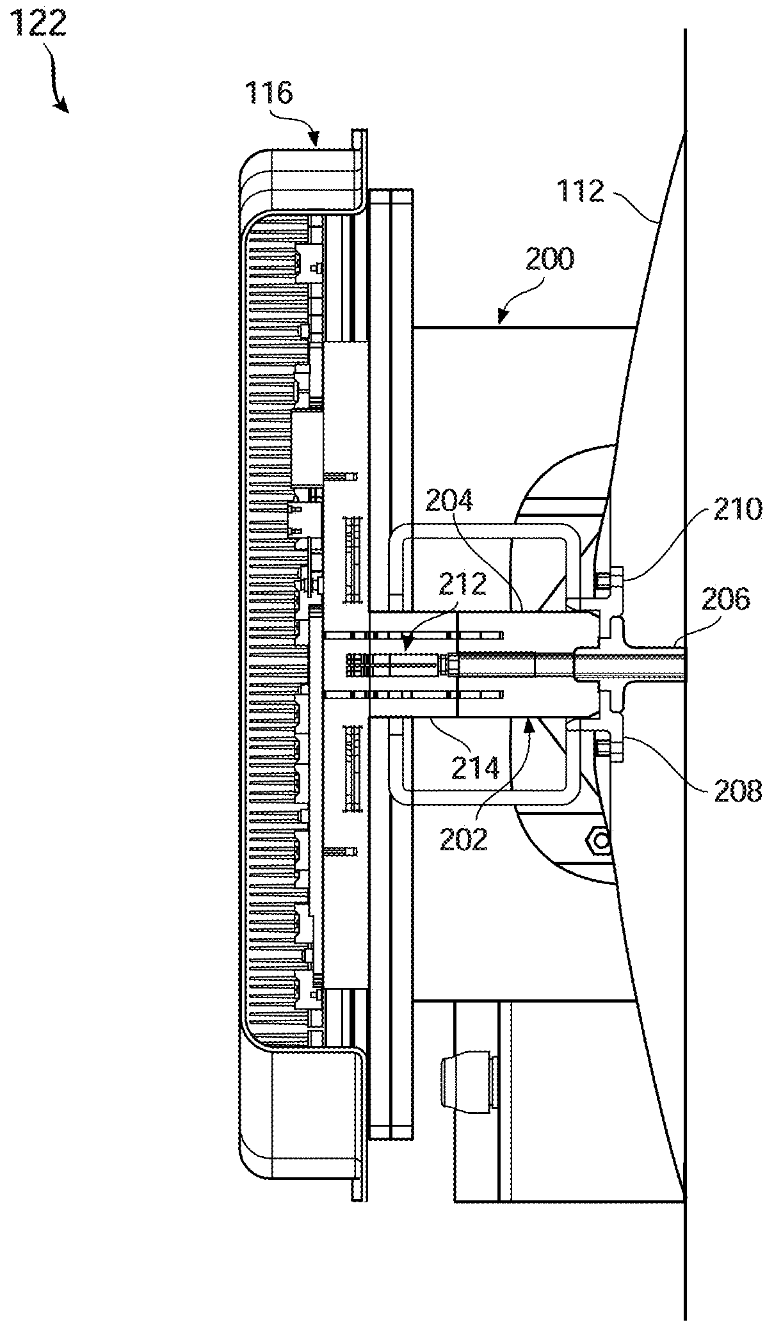
FIG. 2B illustrates a cross-sectional view of the antenna communication system showing a waveguide assembly in accordance with embodiments of the present disclosure.

Referring to FIGS. 2A and 2B, embodiments of the present disclosure are directed to a waveguide assembly 200 (FIG. 2B) to provide an interface between a reflector 112 for a parabolic antenna and an integrated signal chain 116 which can include a transmit/receive integrated assembly, a modem, and thermal management structures. While in one aspect the waveguide assembly 200 is directed to or can be implemented in a gateway terminal 106 (see FIG. 1), the waveguide assembly 200 can apply to any communication interface in which a first waveguide portion 204 connects to a second waveguide portion 206 as shown in FIG. 2B.

The waveguide-to-waveguide coupling between the feed assembly (not shown) at the front of the reflector 112 and the integrated signal chain configured 116 to communicate with the reflector 112 can be aligned for precision performance. Efficient communication of signals from one physical waveguide to another relies on dimensional accuracies in terms of geometric alignment features. This coupling of waveguides often requires alignment accuracy. A tolerance problem can occur in which multiple alignment issues can combine or stack to exceed a required accuracy. For example, the feed or waveguide interface can introduce reflector distortions when the integrated signal chain is hard mounted to the back of the reflector. Therefore, embodiments of the present disclosure are directed to an improved waveguide assembly that mitigates tolerance issues. As shall be introduced in this disclosure, the improved waveguide assembly can include a combination of a gap and choke interface between the portions of the waveguide assembly. In that regard, the portions being configured to be able to move relative to each other and a choke configured in one of the portions enables electromagnetic signals to be passed through the waveguide assembly. The new waveguide assembly alleviates the need for high level tolerances traditionally required and provides for signals to pass even when the different portions of the waveguide assembly move relative to each other.

A blind mate waveguide interface as described herein can correct for tolerance variation without introducing reflector distortions. The proposed structure can include first and second waveguides having a non-contact interface and an axially symmetric choke to mitigate reflections and leakage. A seal can mitigate moisture and dust ingress. The waveguide interface should provide an axial range of movement between the first and second waveguides without significant impact in performance. The range of movement can be dependent on the wavelengths associated with the frequency (or frequencies) of operation for the system. Thus, the dimensions and the gap can be configured such that a range of axial movement can be approximately λ/10 (λ being a wavelength of a transmitted electromagnetic signal).

Although shown in the illustrated embodiment of FIG. 2A as providing a waveguide assembly 200 for connecting an integrated signal chain configured 116 and a reflector 112, waveguide assemblies 200 as described herein can be used to connect other types of communication components.

FIG. 2A illustrates the structural context of the disclosed waveguide assembly 200. An antenna communication system 110 can include a reflector 112 and a main structural beam 114 for supporting the reflector 112. An integrated signal chain (which may be a line replaceable unit, LRU assembly) 116 is shown as also being attached to the main structural beam 114 and can include therein a transmit/receive integrated assembly, a modem and thermal management structures (not shown in FIG. 2A). In one embodiment, the integrated signal chain 116 may have a planar and/or compact configuration. However, the particular configuration of the integrated signal chain 116 is not relevant to the present disclosure which focuses on the waveguide interface that is generally positioned at a transition between the reflector 112 and the planar integrated signal chain 116.

The reflector 112 is supported at least in part by a first support 118 and a second support 120 which connect the reflector 112 to the main structural beam 114, which may be flexure supports or any other suitable supports. The first support 118 and the second support 120 may be connected to a main structural beam 114. In the illustrated embodiment, because the reflector 112 is supported by the first support 118 and the second support 120, there is little to no axial constraint at the transition portion 122 between the reflector 112 and the integrated signal chain 116. Notably, the reflector 112 and the planar integrated signal chain 116 are both mounted to the main structural beam 114. The main structural beam 114 is not necessarily configured to be precise in its tolerance for movement or structural stability. Thus, some movement is expected for the components connected to the main structural beam 114. The waveguide assembly 200 disclosed herein maintains the ability of the system to transmit a bandwidth of signals even when the different portions of the waveguide assembly 200 move relative to one another.

FIG. 2B illustrates an up-close, cross-sectional view of a waveguide assembly 200, which is a portion of the transition portion 122 of the communication system 110 of FIG. 2A. Because the reflector 112 and the planar integrated signal chain 116 are both mounted to an imprecise main structural beam 114 (FIG. 2A), the waveguide assembly 200 disclosed herein needs to accommodate a sufficient amount of tolerance to enable movement between different portions of the waveguide assembly 200 while maintaining proper signal transmission through the waveguide assembly 200. The waveguide assembly 200 includes first and second waveguide portions 204 and 206 having a waveguide channel interface 202 extending therethrough for providing a transition between the reflector 112 and the integrated signal chain 116. The integrated signal chain 116 is shown in cross-sectional view with various components such as waveguides, transmit/receive components and thermal management structures included within a compact structure. In the illustrated embodiment, the waveguide channel interface 202 is a blind mate interface between the first waveguide portion 204 and the second waveguide portion 206.

The first waveguide portion 204 connects to and communicates with the integrated signal chain 116. A septum polarizer 212 may be configured inside a polarizer waveguide structure 214 that may be coupled to the integrated signal chain 116. The polarizer waveguide structure 214 interfaces with the first waveguide portion 204. In some embodiments, the polarizer waveguide structure 214 may be a dual circular polarization component. The septum polarizer 212 is described by way of example, but other types of polarizers can be used without limit, such as a transducer plus a polarizer or an orthomode transducer (OMT).

The second waveguide portion 206 connects to and communicates with a feed assembly (not shown) of the reflector 112. First and second attachments 208, 210 are shown for connection of the second waveguide portion 206 of the waveguide assembly 200 to the reflector 112. The first and second attachments 208, 210 can be bolts or any other fastener or attachment mechanism to attach the second waveguide 206 to the reflector 112.

In one aspect, it is again noted that the reflector 112 is secured to the main structural beam 114 using supports 118 and 120 as shown in FIG. 2A, such that there is primarily radial support at the waveguide interface 202 between the first and second waveguide portions 204 and 206.

Figure 3A:
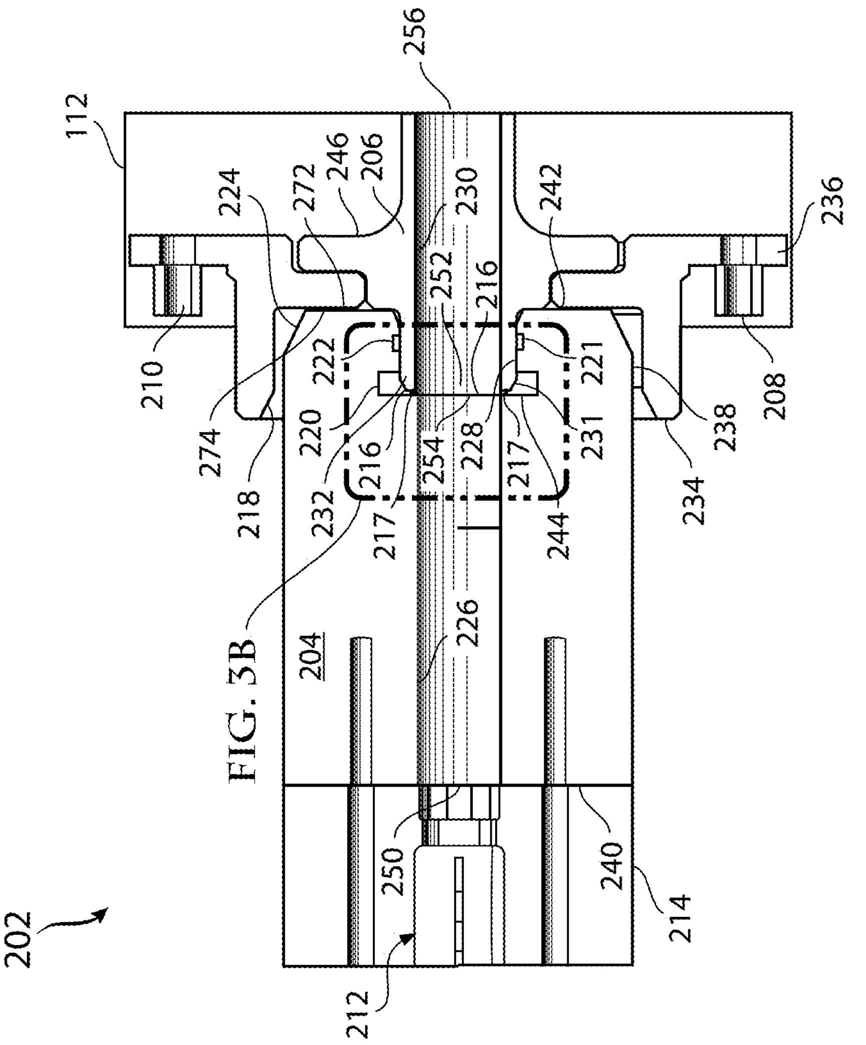
FIG. 3A illustrates a cross-sectional view of the waveguide assembly of FIG. 2B in accordance with embodiments of the present disclosure.

FIG. 3A illustrates the blind mate waveguide channel interface 202 of FIG. 2B in greater detail. As mentioned above, the polarizer waveguide structure 214 supports the septum polarizer 212 (or other polarizer) and is connected at or near a first end 240 of the first waveguide portion 204. At or near the second end 242 of the first waveguide portion 204, the first waveguide portion 204 connects to a second waveguide portion 206 at or near the first end 244 of the second waveguide portion 206. At or near the second end 246 of the second waveguide portion 206, the second waveguide portion 206 connects to a feed structure (not shown) of the reflector 112.

The first waveguide portion 204 includes a first channel 226 extending there-through, and the second waveguide portion 206 includes a second channel 230 extending there-through. As seen in FIG. 3A, when coupled, the first and second waveguides 204 and 206 provide a combined channel structure for signal communication. First and second attachments 208, 210 can be as discussed above with respect to FIG. 2B. A beveled surface 218 on an outer flange portion 234 of the second waveguide portion 206, a first waveguide bevel 224 on an exterior surface 238 at the second end of the first waveguide portion 204, a second waveguide bevel 231 on the second waveguide portion 206, are discussed in more detail below. Additionally, a gap 216, as well as a stop interface 272 defining a stopping surface 274, are discussed in more detail below.

Although described with reference in FIG. 3A from left to right in the illustrated embodiment (for example, corresponding to signal communication from the integrated signal chain 116 to the reflector 112 as illustrated in FIG. 2B), signal communication as described herein through the combined channel structure provided by the first and second waveguides 204 and 206 can travel in either or both directions (for example, corresponding to signal communication from the integrated signal chain 116 to the reflector 112, signal communication from the reflector 112 to the integrated signal chain 116, or both).

In the illustrated embodiment, the first waveguide portion 204 includes a first channel interface portion 228, shown as a receiving interface, at or near the second end 242 of the first waveguide portion 204. The first end 244 of the second waveguide portion 206 includes a second channel interface portion 232, shown as an extending interface at or near the second end 242 of the first waveguide portion 204, that is received by the first channel interface portion 228 to form the waveguide channel interface 202.

The first and second channel interfaces portions 228 and 232, when combined, can be configured as a blind mate waveguide channel interface 202. In the illustrated embodiment, mating and un-mating first and second interface portions 228 and 232 can be achieved via a sliding mating action along a central axis Y without requiring other connection mechanisms (see FIG. 4B).

As described in greater detail below, the first and second interface portions 228 and 232 are designed to maintain a small gap 216 (see FIG. 3A) between the first and second waveguide channels 226 and 230 when mated to form the waveguide channel interface 202. The gap 216 can work in coordination with the choke 220 to provide the ability of the first and second interface portions 228, 232 to pass frequencies in the operating frequency band. In one aspect, the gap 216 can be configured to be as small as possible (while maintaining the gap such that the portions 228, 232 do not touch) within machine tolerances but not larger than λ/10.

Figure 3B:
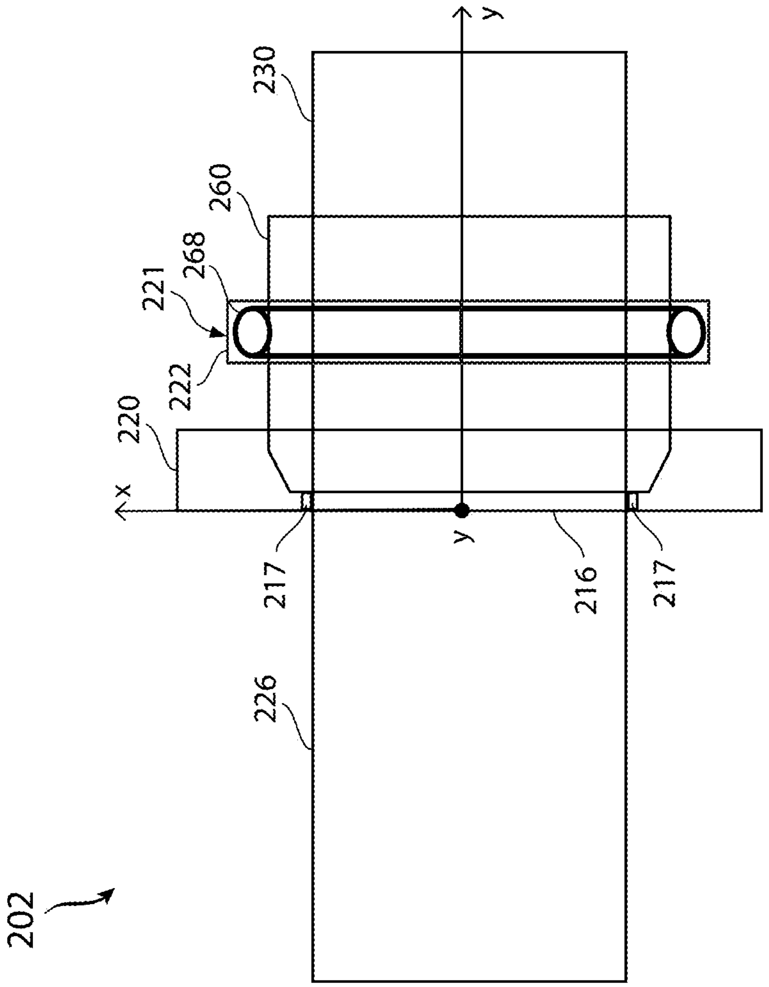
FIG. 3B illustrates an up-close, cross-sectional view of a portion of the waveguide assembly of FIG. 3A.
Figure 3C:
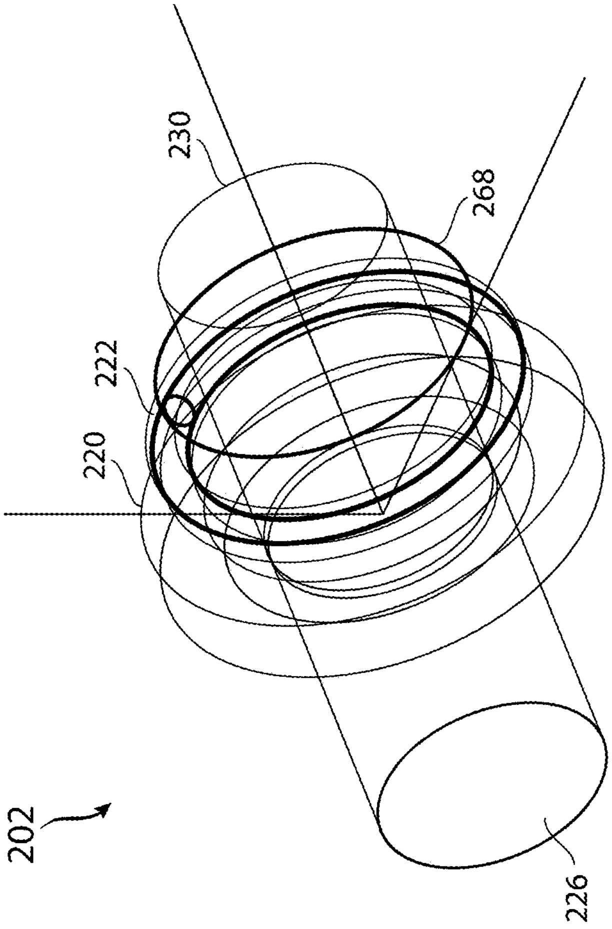
FIG. 3C illustrates an up-close, perspective view of a portion of the waveguide assembly of FIG. 3A.

FIG. 3B illustrates an up-close, cross-sectional view, and FIG. 3C illustrates an up-close, perspective view, of the blind mate waveguide interface channel 202, including the first channel 226, the second channel 230, and the choke 220, and a seal channel 222 (described in more detail below). A transverse axis X is also illustrated in FIG. 3B.

Although shown in the illustrated embodiment as the first waveguide portion 204 including the first interface portion 228 configured as a receiving interface portion and the second waveguide portion 206 including the second interface portion 232 configured as an extending interface portion configured for receipt by the receiving interface portion, the reverse configuration is also within the scope of the present disclosure. For example, the first waveguide portion 204 may include an extending interface portion and the second waveguide portion 206 may include a receiving interface portion. Likewise, other non-male/female mating connection mechanisms are also within the scope of the present disclosure.

The first waveguide portion 204 has a first waveguide channel 226 that is used to transmit electromagnetic signals through the first waveguide portion 204 between a first channel end 250 and a second channel end 252. The first waveguide channel 226 may be continuous through the first waveguide portion 204 from the first channel end 250 that interfaces with the septum polarizer 212 to the second channel end 252 that interfaces with the first channel end 254 of the second waveguide channel 230.

The cross-sectional area of the first waveguide channel 226 may be constant along the length of the first waveguide channel 226 from the first channel end 250 to the second channel end 252. The first waveguide channel 226 can be circular, square, elliptical, single-ridged, double ridged or rectangular in its cross-sectional configuration. The example shown herein is a circular cross-section. In one example, the interior diameter of the first waveguide channel can be chosen based on one or more of the frequency of operation or two or more frequency bands of operation for the specific system. The dimensions generally will be selected such that the size will cause frequencies above a cut-off frequency to pass through the waveguide channel. The dimensions can vary based on configuration and/or size for specific frequencies or groups of frequencies.

The second waveguide portion 206 has a second waveguide channel 230 that is used to transmit electromagnetic signals through the second waveguide portion 204 between a first channel end 254 and a second channel end 256. The second waveguide channel 230 may be continuous through the second waveguide portion 206 from the first channel end 254 that interfaces with the first waveguide portion 204 to the second channel end 254 that interfaces with the reflector 112.

The second waveguide channel 230 may have similar interior cross-sectional dimensions as the first waveguide channel 226, such that the first and second waveguide channels 226 and 230 can combine to form a combined channel structure.

Figure 4A:
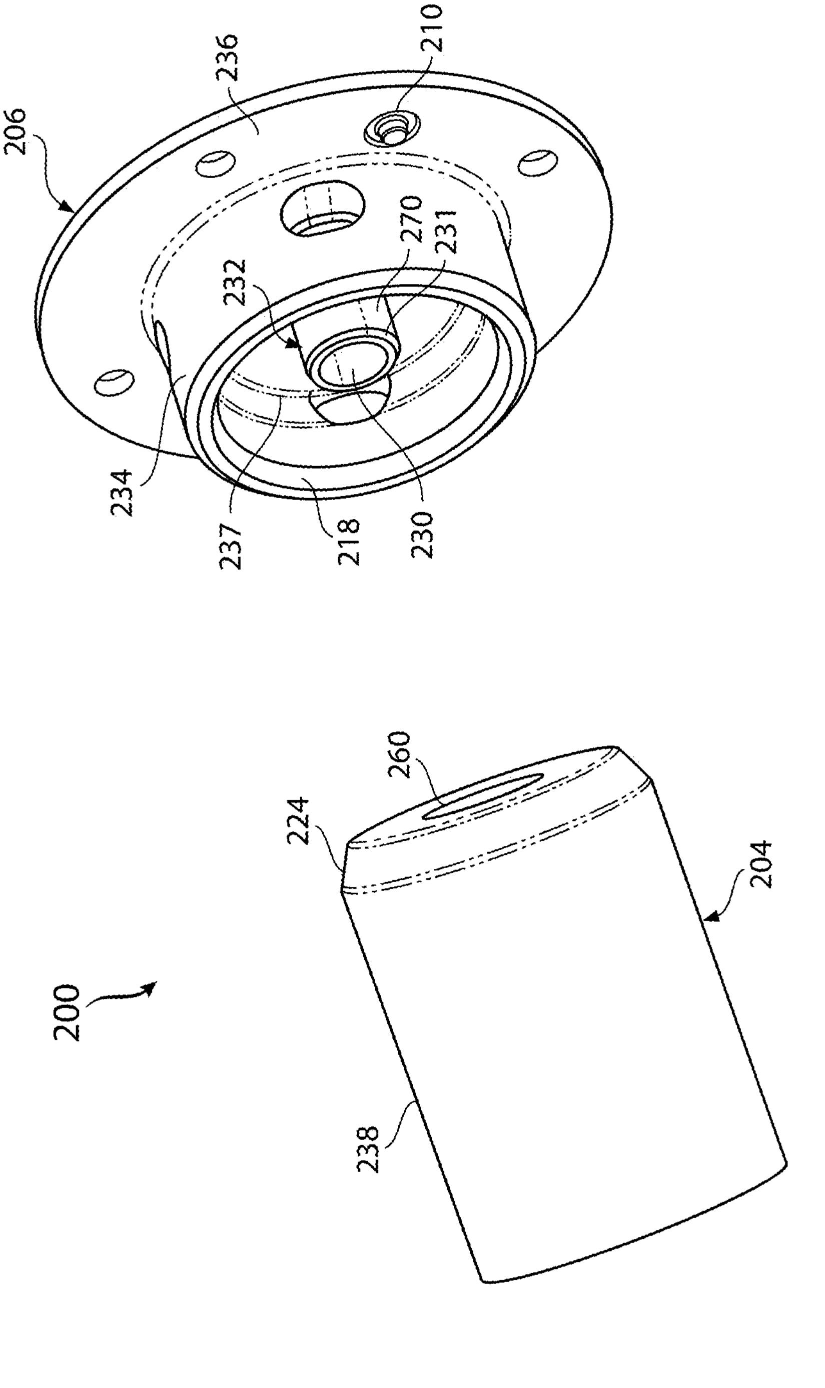
FIG. 4A illustrates a perspective view of first and second waveguide portions of the waveguide assembly of FIG. 2B.
Figure 4B:
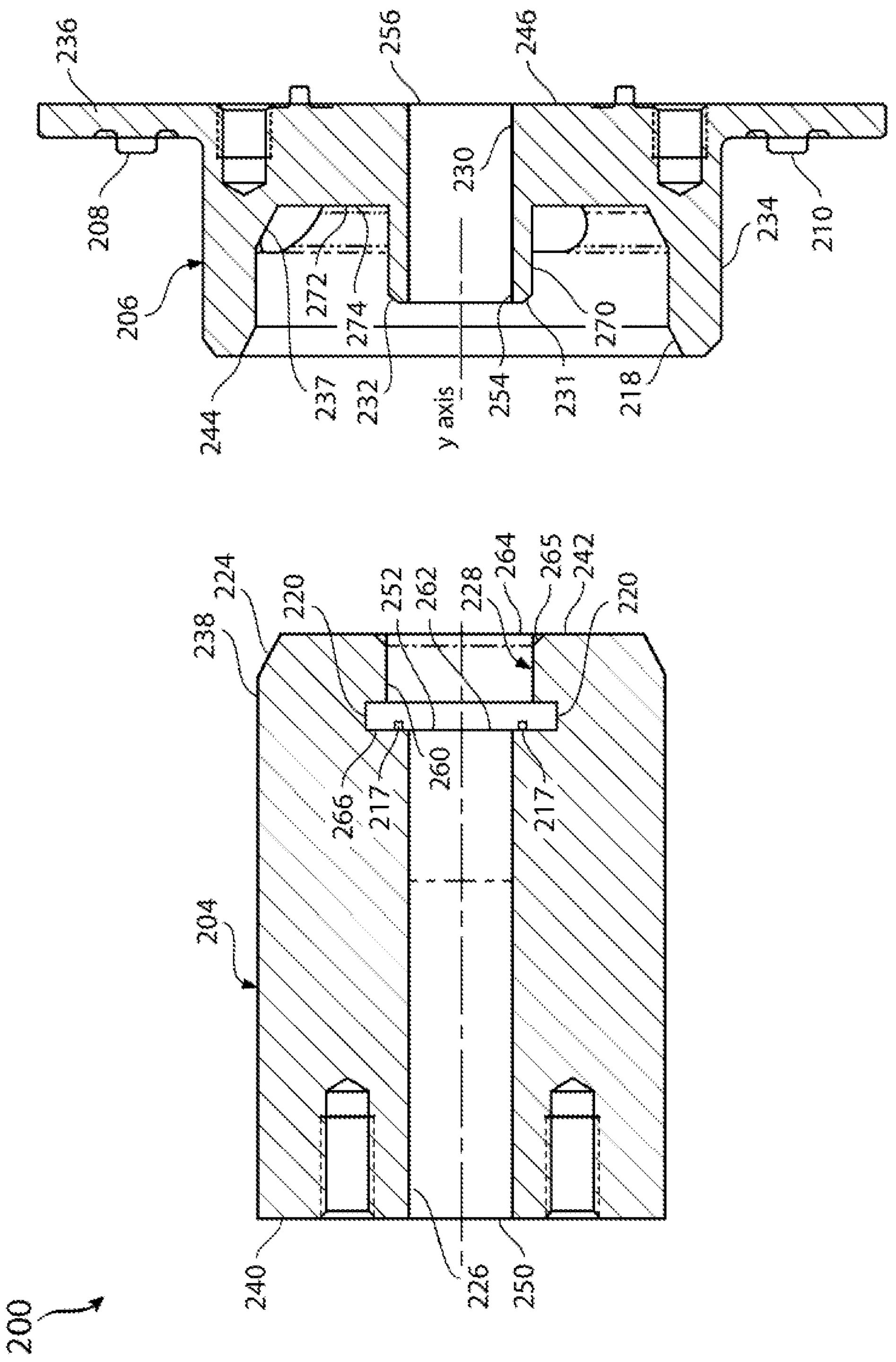
FIG. 4B illustrates a cross-sectional view of first and second waveguide portions of the waveguide assembly of FIG. 2B.

Referring to FIGS. 4A and 4B, the first and second channel interface portions 228 (FIG. 4A) and 232 between the first and second waveguide channels 226 (FIG. 4B) and 230 will now be described in greater detail. As seen in FIG. 3A, the first and second channel interface portions 228 and 232 join with each other at their mating surfaces such that the first and second waveguide channels 226 and 230 form a combined channel structure.

As described above, the first waveguide portion 204 includes a first waveguide channel 226 extending as a thru-hole through the first waveguide portion 204 from a first channel end 250 at the first end 240 of the first waveguide portion 204 to a second channel end 252 at an intermediate location between the first and send ends 240 and 242 of the first waveguide portion 204. At or near the second end 242 of the first waveguide portion 204 is the first interface portion 228 of the first waveguide portion 204. The first interface portion 228 includes a receiver opening 260 that is in alignment with the first waveguide channel 226. The receiver opening 260 of the first interface portion 228 extends from a first end 262 at the second channel end 252 of the first waveguide channel 226 to a second end 264 at the second end 242 of the first waveguide 204. The receiver opening 260 of the first interface portion 228 has cross-sectional dimensions that are larger than the cross-sectional dimensions of the first waveguide channel 226.

At the location where the receiver opening 260 meets the second channel end 252 of the first waveguide channel 226, a shoulder 266 is defined. In the case of the first waveguide channel 226 being designed as a circular cross-section bore, the shoulder 262 may be an annular shoulder.

As seen in the illustrated embodiment of FIG. 4B, the receiver opening 260 of the first waveguide portion 204 may further include a choke 220, illustrated as a choke channel or groove in the inner surface of the receiver opening 260 of the first waveguide portion 204. The choke provides a space between the receiver opening 260 of the first waveguide portion 204 and a neck portion 270 (or extending portion) of the second waveguide portion 206, which as described in greater detail below, may provide virtual continuity through the waveguide joint to minimize energy leakage. The choke 220 can be configured (in a fixed manner) in either the first waveguide portion 204 or the second waveguide portion 206. As shown, the choke 220 in one example is a fixed structure in the first waveguide portion 204 and thus maintains its dimensions regardless of the position or movement of the second waveguide portion 206. Configuring the choke 220 in the first waveguide portion 204 has a purpose which is to enable a broadband application for the waveguide 200. Without a choke 220 which is fixed as shown, the sliding in and out of the second waveguide portion 206 within the first waveguide portion 204 can cause a change in the frequency response because the dimensions of the system change. In other words, if a choke is primarily defined by the combination of the structure of both the first waveguide portion 204 and the second waveguide portion 206, then movement by one or both of the waveguide portions 204, 206 relative to each other would change the choke dimensions and thus impact or change the frequency response of the system and how wide of a band the system can cover. To enable a wideband operation, by providing a fixed part of the first waveguide portion 204, the system can have a frequency response that enables wideband use even in view of movement of the first waveguide portion 204 relative to the second waveguide portion 206.

Likewise, as seen in the illustrated embodiment of FIGS. 3A and 3B, the receiver opening 260 (FIG. 3B) of the first waveguide 204 (FIG. 3A) may further include a sealing mechanism. The sealing mechanism 221 is illustrated as a seal channel 222, shown as a groove in the inner surface of the receiver opening 260, which may include an exemplary o-ring 268 (FIG. 3B) disposed within the seal channel 222 (see FIG. 3B). The sealing mechanism can seal any clearance opening between the interior surface of the receiving portion 260 of the first waveguide portion 204 and the outer surface of a neck portion 270 of the second waveguide portion 206 (FIG. 3A) (described in greater detail below), providing for environmental or other sealing reasons.

Although shown as being disposed within the receiver opening 260 of the first waveguide, the sealing mechanism 221 between the receiver opening 260 and the neck portion 270 may also be disposed on the external surface of the neck portion. Although illustrated as an o-ring sealing mechanism, other sealing mechanisms are within the scope of the present disclosure.

Returning to FIG. 4B, the second waveguide portion 206 will now be described. The second waveguide portion 206 includes the second waveguide channel 230 extending from a first end 254 to a second end 256. As discussed above, when the second waveguide portion 206 is coupled to the first waveguide portion 204, the first and second waveguide channels 226 and 230 form a combined channel structure as seen in FIG. 3A. The second waveguide portion 206 includes an attachment flange structure 236 configured for connecting with the reflector 112 or another portion of the communication system 110 as shown in FIG. 2A (see attachments 208 and 210 in FIGS. 2B and 4B) and for surrounding the second waveguide channel 230.

At the first end 254 of the second waveguide channel 230, the second waveguide portion 206 includes a neck portion 270 having inner and outer surfaces and a thickness extending as the second interface portion 232 for mating with the first interface portion 228 of the first waveguide 204. The second waveguide channel 230 has cross-sectional dimensions that align with the cross-sectional dimensions of the first waveguide channel 230 to form a combined channel structure as seen in FIG. 3A, and the neck portion 270 has cross-sectional dimensions designed to be received within the receiver opening 260 of the first interface portion 230. Therefore, the outer surface of the neck portion 270 of the second waveguide portion 206 is received within the inner surface of the receiver opening 260 of the first waveguide portion 204.

Referring to FIGS. 3B and 4B, the clearance between the outer surface of the neck portion 270 of the second waveguide 206 and the inner surface of the receiver opening 260 of the first waveguide 204 is designed and configured for the neck portion 270 to slip into the receiver opening 260 with ease, but for minimal movement of the two parts relative to each other when the waveguide system is in operation. The system can be connected via what is called a "clearance fit" or a "slip fit" to keep the parts from getting caught with each other. Such a fit will enable the portions to slip or slide independent of each other. Any suitable distance between the two surfaces can be implemented in the structure to achieve a slip fit.

Adjacent the neck portion 270 of the second waveguide portion 206 is an example location of a stop interface 272 (FIG. 4B), shown as a positive stop, defining a stopping surface 274 (FIG. 4B) when the first waveguide portion 204 is connected to the second waveguide portion 206. The stopping surface 274 is an intermediate surface defined in the second waveguide portion 206 between the first end 244 and the second end 246 of the second waveguide portion 206. As the neck portion 270 of the second waveguide portion 206 is received within the receiver opening 260 of first interface portion 204, the second end 242 (FIG. 4B) of the first waveguide portion 204 abuts the stopping surface 274 of the second waveguide 206, preventing further lateral movement of the first and second waveguide portions 204 and 206 relative to each other along the central axis Y.

Because the stopping interface 272 can be designed to prevent the first waveguide channel 226 and the second waveguide channel 230 from complete engagement (or from touching), a gap 216 can be formed between the first waveguide channel 226 and the second waveguide channel 230 (as seen in the close-up view of FIG. 3B). The gap 216 is maintained to enable the choke 220 to be operational. Otherwise, if the first and second waveguide portions 204 and 206 were to touch, the choke 220 would no longer operate. Therefore, the gap 216 should be above zero in length to prevent the first and second waveguide portions 204 and 206 from touching and may have some give or tolerance of the gap size which can be configured based on the wavelength associated with the signals to be passed through the waveguide assembly 200. In another example, an alternate or additional positive stop 217 can be configured as shown in FIGS. 3A, 3B and 4B between the neck portion 270 of the second waveguide portion 206 and the receiver opening 260 of first interface portion 204. There are a number of different locations where a stop can be positioned to maintain the gap 216.

In another example, the gap 216 (or gap size) can be equal to or less than $\lambda/10$ ($\lambda$ being a wavelength of a transmitted electromagnetic signal). Generally, a smaller allowable size for the gap size can be based on manufacturing tolerances with a higher allowable size at approximately $\lambda/10$ or more. At dimensions above a desirable size for the gap 216, signal reflections and a polarization swap can occur with the signals in the signal chain and thus degradation in the performance of the system.

There should be effective coupling between the two waveguide portions 204, 206. In one example, a positive stop or gasket or other structure can be implemented between the first waveguide portion 204 and the second waveguide portion 206 to prevent the gap 216 from closing up and short-circuiting the waveguide channel interface 202.

A minimum gap size 216 can be used that is above zero and less than or equal to λ/10. The gap size 216 should be maintained such that the first waveguide portion 204 and the second waveguide portion 206 are prevented from touching to enable the choke 220 to work. As noted above, a positive stop, gasket or other structure can be configured in a number of different locations within the waveguide assembly 200 to prevent the first waveguide portion 204 from touching the second waveguide portion 206 at the interface defining the waveguide channels 226, 230.

The choke 220 is designed to surround the gap 216. In one embodiment, the first and second waveguide channels 226 and 230 have circular cross-sections, and the choke 220 is an annular groove surrounding the gap 216, with the choke 220 having axial symmetry. The sizing of the choke 220 may be based on or independent of the sizing of the gap 216. In one example, a distance from the interior surface of the waveguide channel (the first channel) 226 to a beginning of the choke 220 structure can be λ/4 or a quarter of a wavelength. The height of the choke 220 can also be about λ/4 or a quarter of a wavelength. These are example sizes and the position and size of the choke 220 can vary from these example dimensions by, for example, up to +/−20%, up to +/−25%, or up to +/−30%. The use of a choke 220 at the gap 216 can mitigate frequency shifts with axial alignment to maximize the useful bandwidth through the waveguide assembly 200. In that regard, the choke 220 can provide virtual continuity through the waveguide joint to minimize energy leakage. Such design is configured to allow for a small amount (for example, 15-20 mil) of axial movement without a significant performance impact to electromagnetic waves passing through the waveguide interface 202.

In addition to the waveguide interface 202, the waveguide assembly 200 may be designed with additional attachment support to secure the blind mate attachment of the first and second waveguide portions 204 and 206. In the illustrated embodiment of FIGS. 4A and 4B, the second waveguide portion 206 includes an outer flange portion 234 configured to surround or nest the outer surface 238 of the first waveguide portion 204 when the first and second waveguide portions 204 and 206 are coupled to each other.

As described above, the attachment flange portion 236 may extend from the second waveguide portion 206 to allow for at least first and second attachments 208, 210 (see also FIG. 2B) with the reflector 112.

As seen in the different embodiments of FIGS. 3A and 4B, the outer flange portion 234 and the attachment flange portion 236 may be integrally formed into the second waveguide portion 206 (see FIG. 4A) or may be formed as a separate part that is combined with the second waveguide portion 206 (see FIG. 4B).

Referring to FIGS. 4A and 4B, to aid in the blind mate attachment between the first waveguide portion 204 and the second waveguide portion 206, a first waveguide bevel 224 may be configured on the exterior surface 238 at the second end of the first waveguide portion 204 to aid in coarse alignment between the first waveguide portion 204 and the second waveguide portion 206. The second waveguide portion 206 may also include a beveled surface 218 on the outer flange portion 234 to further aid in the course alignment. As seen in FIGS. 4A and 4B, the inner surface of the outer flange portion 234 may include a mating beveled inner surface 237.

In addition, a second waveguide bevel 231 may be configured on the neck portion 270 of the second waveguide portion 206 to aid in alignment of the neck portion 270 with the receiving portion 260 of the first waveguide portion 204.

The second waveguide bevel 231 can be configured to aid in the fine alignment of the first waveguide portion 204 and the second waveguide 206. The first waveguide portion 204 may also include a bevel 265 (FIG. 4B) at the second end 262 (FIG. 4B) of the receiver opening 260 to further aid in the fine alignment of the first waveguide portion 204 and the second waveguide 206.

Using these bevel structures and other structures of the two waveguides portions 204 and 206, when the first waveguide portion 204 and the second waveguide portion 206 are connected together to form the waveguide assembly 200, the structures can aid in self-centering along a central axis Y (see FIG. 4B) with both coarse and fine alignment To connect the waveguide assembly 200, the first waveguide portion 204 and the second waveguide portion 206 are attached by a sliding motion along the y-axis (seen in FIG. 4B). When the stopping interface 272 (FIG. 4B) stops further movement along the y-axis, the waveguide assembly 200 is fully connected. Likewise, for detachment, for example, for part replacement, the first waveguide portion 204 and the second waveguide portion 206 are detached by reverse sliding motion along the y-axis (seen in FIG. 4B).

A waveguide assembly 200 as described herein can be configured as a mating structure for waveguide portions or components to achieve mechanical simplicity, as well as electrical properties such as low insertion loss and high return loss. The waveguide assembly 200 may be made from machined metal parts.

Designed with a choke, the waveguide assemblies 200 described herein provide a connection with improved electrical properties over a range of axial motion and alignment tolerances. The electrical and mechanical properties of the waveguide assemblies 200 are robust to maintain performance over wide bandwidths. For example, the waveguide assemblies 200 can simultaneously support Rx and Tx bands (for example, one band can have a range of 17.8-19.7 GHz and another band can have a range of 27.5-30 GHz), and is able to tolerate lower levels of part precision, imperfect mating of the flanges without metal-to-metal contact and gaps up to λ/10 or more between the waveguide flange features. In another aspect, dependent on the operational frequency or group of operational frequencies, the amount of axial movement of the system can be configured to be approximately λ/10. Where only a single operating band (or a narrow band) is used and not multiple disparate, overlapping at least in part, or non-contiguous operating bands of frequency, the tolerance levels or the acceptable range of movement can be expanded.

In addition, a waveguide assembly 200 as described herein may further offload weight, for example, from the reflector 112 thus minimizing induced surface distortions. The structure of a waveguide assembly 200 as described herein may reduce part fabrication tolerance requirements and enables a proper alignment using the reduced tolerance requirements.

A blind mate waveguide assembly 200 as described herein also may have a structure that improves serviceability, reduces assembly time, mean time to recovery in case a part needs replacing, and so forth. In one embodiment, the assembly may include detents such as sub-miniature push-on (SMP) or plug-in connectors, such as those seen in coax connectors to prevent improper motion or movement. In another embodiment, the assembly includes a smooth bore to allow axial movement. Different structures can be implemented to hold the different portions of the waveguide assembly 200 together.

The blind mate waveguide assembly 200 described herein is suitable for high power applications. Furthermore, the blind mate waveguide assembly 200 is suitable for larger diameter waveguides supporting higher order modes like, e.g., TM01 and TE21 modes used for monopulse tracking systems. The waveguide interface 202 is also suitable for rotary joints using rotational symmetric modes like, e.g., TM01 or TE01. One of skill in the art will understand the different modes of operation for the propagation of signals through waveguides referenced above. For example, the TM01 mode is a first higher order mode of circular waveguides after the TE11 mode. The different modes have different signal patterns. The field pattern of the TM01 mode consists of radial diverging electric field and an azimuthally symmetric magnetic field. It is sufficient to note for this description that the various modes mentioned above and others as well can be supported in the blind mate waveguide interface 202 disclosed herein.

Figure 5:
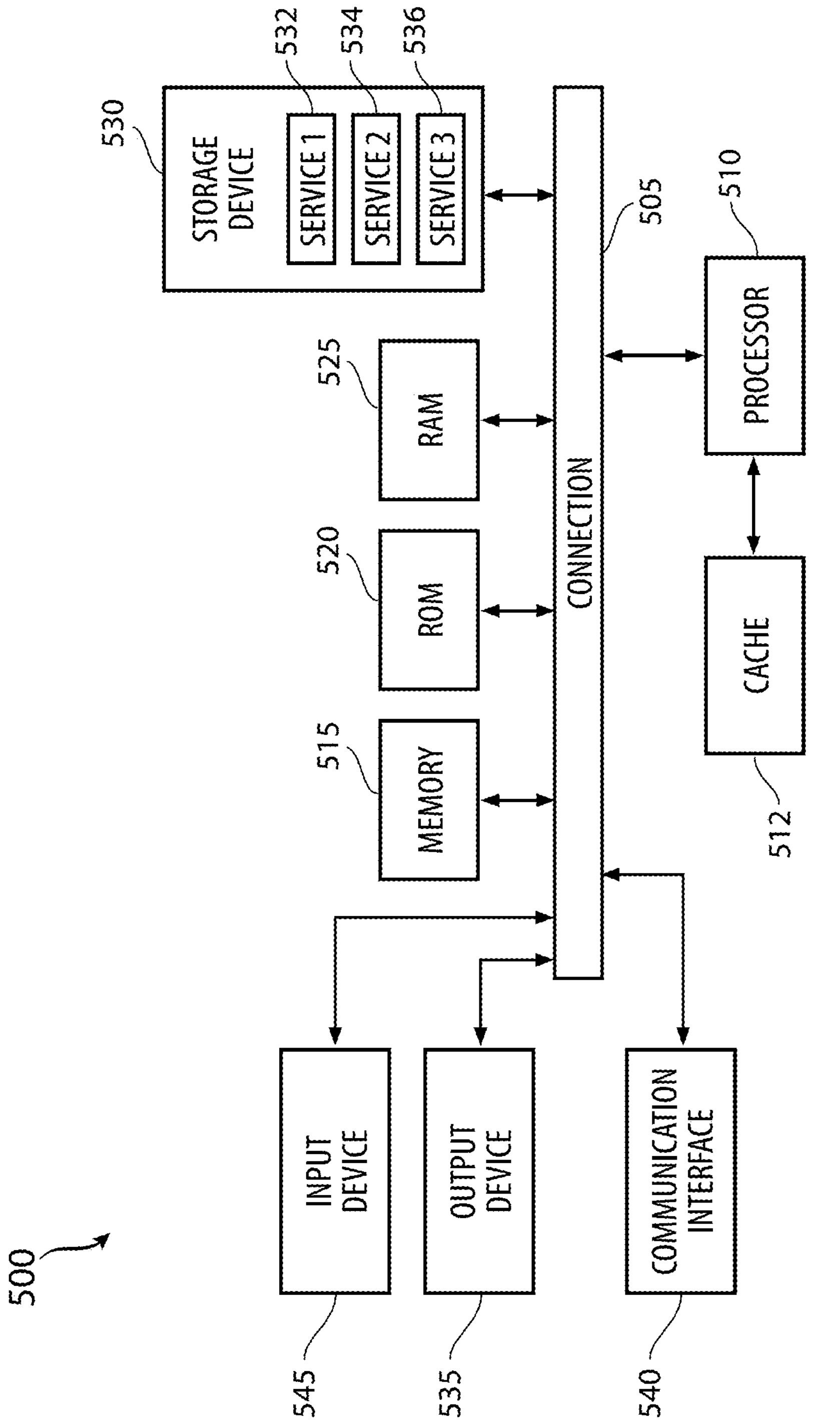
FIG. 5 illustrates a basic computer system which can be implemented with other aspects of the present disclosure.

FIG. 5 illustrates example computer device that can be used in connection with any of the systems or components of the waveguide interface disclosed herein. For example, a computer system 500 might be included as part of the integrated signal chain 116 of FIG. 2A and an embodiment of this disclosure can include the waveguide interface 200 (shown in FIG. 2B) plus, in some aspect, a computing system 500. The computing system 500 can also represent any RF transmitter/receiver, amplifier or any other RF or signal processing component 116. In one example, FIG. 5 illustrates a computing system 500 including components in electrical communication with each other using a connection 505, such as a bus. System 500 includes a processing unit (CPU or processor) 510 and a system connection 505 for coupling various system components including the system memory 515, such as read only memory (ROM) 520 and random access memory (RAM) 525, to the processor 510. The system 500 can include a cache 512 of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1—532, service 2—534, and service 3—536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A waveguide assembly, comprising:

a first waveguide portion having a first end, a second end, and an outer surface and a first waveguide channel extending between the first end and the second end, the first waveguide channel having cross-section dimensions, the first waveguide portion further including a receiving portion configured at the second end, the receiving portion having cross-sectional dimensions that are larger than the cross-sectional dimensions of the first waveguide channel; and a second waveguide portion having an outer flange portion, a first end, a second end, and a second waveguide channel extending between the first end and the second end, the second waveguide channel having cross-sectional dimensions that are substantially the same as the cross-sectional dimension of the first waveguide channel and having an extending portion at the first end that is complementary to the receiving portion at the second end of the first waveguide portion, wherein the outer flange portion is configured to surround the outer surface of the first waveguide portion, wherein the first waveguide portion and the second waveguide portion are configured to connect such that the first waveguide channel and the second waveguide channel form a combined channel, wherein the combined channel includes a gap interface between the first waveguide channel and the second waveguide channel.

2. The waveguide assembly of claim 1, wherein a gap size of the gap interface is less than or equal to $\lambda/10$.

3. The waveguide assembly of claim 1, wherein the waveguide assembly includes a choke in surrounding relationship with the gap interface.

4. The waveguide assembly of claim 3, wherein the choke includes an internal groove configured to surround the gap interface between the first waveguide channel and the second waveguide channel.

5. The waveguide assembly of claim 3, wherein the choke is an axially symmetric choke.

6. The waveguide assembly of claim 1, wherein the first and second waveguide channels have circular cross-sectional dimensions.

7. The waveguide assembly of claim 1, wherein the receiving portion of the first waveguide portion has circular cross-sectional dimensions.

8. The waveguide assembly of claim 1, further comprising a seal between the receiving portion of the first waveguide portion and the extending portion of the second waveguide portion.

9. The waveguide assembly of claim 3, wherein the choke is an annular groove defined in the receiving portion of the first waveguide portion.

10. The waveguide assembly of claim 1, wherein a first end of the waveguide assembly is configured to connect to a polarization component.

11. The waveguide assembly of claim 1, wherein a second end of the waveguide assembly is configured to connect to a reflector.

12. The waveguide assembly of claim 1, wherein the first waveguide portion further comprises a first bevel portion for coarse alignment.

13. The waveguide portion assembly of claim 1, wherein the second waveguide further comprises a second bevel portion for fine alignment.

14. The waveguide assembly of claim 1, wherein the first and second waveguide portions include a positive stop between the first and second waveguide portions, the positive stop configured to maintain a gap size of the gap interface such that the first and second waveguide portions will not touch.

15. The waveguide assembly of claim 1, wherein the second waveguide portion further includes an attachment flange portion for attachment of the second waveguide portion to another component.

16. A method of coupling a waveguide assembly, the method comprising:

slidingly connecting a first waveguide portion and a second waveguide portion, the first waveguide portion having a first end, a second end, and a first waveguide channel extending between the first end and the second end, the first waveguide channel having cross-section dimensions, the first waveguide portion further including a receiving portion configured at the second end, the receiving portion having cross-sectional dimensions that are larger than the cross-sectional dimensions of the first waveguide channel, and the second waveguide portion having a first end, a second end, and a second waveguide channel extending between the first end and the second end, the second waveguide channel having cross-sectional dimensions that are substantially the same as the cross-sectional dimension of the first waveguide channel and having an extending portion at the first end that is complementary to the receiving portion of the second end of the first waveguide portion, wherein the first waveguide portion and the second waveguide portion are configured to connect such that the first waveguide channel and the second waveguide channel form a combined channel, wherein the combined channel includes a gap interface between the first waveguide channel and the second waveguide channel; and connecting a polarization component to the first end of the first waveguide portion.

17. The method of claim 16, further comprising connecting a reflector to the second end of the second waveguide portion.

18. A communication system comprising:

a polarizer;

a first waveguide portion having a first end and a second end;

a second waveguide portion having a first end and a second end, wherein the first waveguide portion and the second waveguide portion are coupled at the second end of the first waveguide portion and the first end of the second waveguide portion to define a waveguide channel having a gap interface between the first and second waveguide portions; and a reflector, wherein the polarizer is coupled to the first end of the first waveguide portion and the reflector is attached to the second end of the second waveguide portion.

19. The communication system of claim 18, further comprising:

a choke configured in the first waveguide portion or the second waveguide portion.

20. The communication system of claim 19, wherein a gap size of the gap interface is less than or equal to $\lambda/10$, wherein $\lambda$ comprises a wavelength of a signal passing through the communication system.

* * * * *